(12) United States Patent
O'Connor

(10) Patent No.: US 10,447,729 B2
(45) Date of Patent: Oct. 15, 2019

(54) METHODS AND SYSTEMS FOR ACCESSING A RESOURCE WITH MULTIPLE USER IDENTITIES

(75) Inventor: Brendan O'Connor, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 768 days.

(21) Appl. No.: 12/973,618

(22) Filed: Dec. 20, 2010

(65) Prior Publication Data
US 2011/0320955 A1    Dec. 29, 2011

Related U.S. Application Data

(60) Provisional application No. 61/358,124, filed on Jun. 24, 2010.

(51) Int. Cl.
*H04L 29/06* (2006.01)
*G06F 21/60* (2013.01)

(52) U.S. Cl.
CPC ........ *H04L 63/1466* (2013.01); *G06F 21/604* (2013.01); *H04L 63/104* (2013.01); *G06F 2221/2145* (2013.01); *G06F 2221/2149* (2013.01)

(58) Field of Classification Search
CPC .................................................. G06F 21/604
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |

(Continued)

OTHER PUBLICATIONS http://www.gamesdbase.com/Media/SYSTEM/Microsoft_Xbox_360/Manual/formated/Call_of_Duty%C2%AE_2_-_2005_-_Activision.pdf, p. 10.*

(Continued)

*Primary Examiner* — Matthew J Ellis
(74) *Attorney, Agent, or Firm* — Jaffery, Watson, Mendonsa & Hamilton LLP

(57) ABSTRACT

Systems and methods for providing concurrent access to a resource via multiple user identities via a single client entity. The client entity is allowed access to the resource utilizing a first user identity. An attempt to access the resource with the client entity utilizing a second user identity is detected. The second user identity is a child identity of the first user identity. The attempt to access the resource is restructured as an attempt to access the resource with a third user identity that is not a child identity of the first user identity. The restructured request is forwarded to the resource using the third user entity to access the resource. A response from the resource is restructured as a response to the client entity accessing the resource utilizing the second user identity. The restructured response is sent to the client entity accessing the resource utilizing the second user identity.

20 Claims, 8 Drawing Sheets

(56) References Cited

U.S. PATENT DOCUMENTS

| | | |
|---|---|---|
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,178,425 B1 | 6/2001 | Brodersen et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,976,164 B1* | 12/2005 | King .................. G06Q 20/202 705/21 |
| 7,340,411 B2 | 3/2008 | Cook |
| 7,620,655 B2 | 11/2009 | Larsson et al. |
| 8,281,372 B1* | 10/2012 | Vidal ............................. 726/5 |
| 8,935,235 B1* | 1/2015 | Berger et al. ................. 707/721 |
| 2001/0013096 A1* | 8/2001 | Luckenbaugh ... G06F 17/30861 713/154 |
| 2001/0044791 A1 | 11/2001 | Richter et al. |
| 2002/0016861 A1* | 2/2002 | Simonoff ...................... 709/250 |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0054139 A1* | 5/2002 | Corboy ............ G06F 17/30899 715/804 |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0165719 A1* | 7/2005 | Greenspan et al. ............... 707/1 |
| 2006/0236382 A1* | 10/2006 | Hinton et al. ..................... 726/8 |
| 2007/0101418 A1* | 5/2007 | Wood ....................... G06F 21/31 726/8 |
| 2007/0217557 A1* | 9/2007 | Schiff .................... G06F 21/41 375/354 |
| 2008/0209050 A1* | 8/2008 | Li ............................ H04L 29/06 709/227 |
| 2009/0204386 A1* | 8/2009 | Seligman et al. ................. 704/2 |
| 2012/0324547 A1* | 12/2012 | Vidal ................................ 726/4 |

OTHER PUBLICATIONS http://web.archive.org/web/20061210164031/http://manuals.playstation.net/document/en/ps3/current/browser/browser.html.* http://web.archive.org/web/20070716201011/http://manuals.playstation.net/document/en/ps3/current/users/login.html.* http://web.archive.org/web/20090423022133/http://www.wikihow.com/Import-other-Mail-Sites-to-Gmail.* http://gmailblog.blogspot.com/2009/05/import-your-mail-and-contacts-from.html.*

Eric Law, https://blogs.msdn.microsoft.com/ieinternals/2009/09/18/understanding-domain-names-in-internet-explorer/ p. 1. (Year: 2009).*

Vipin Samar, Single Sign-On Using Cookies for Web Applications, 1999, pp. 1-6 (Year: 1999).*

* cited by examiner

METHODS AND SYSTEMS FOR ACCESSING A RESOURCE WITH MULTIPLE USER IDENTITIES

CLAIM OF PRIORITY

This application claims the benefit of U.S. Provisional Patent Application 61/358,124 entitled "METHODS AND SYSTEMS FOR MAINTAINING MULTIPLE CONCURRENT PRIVILEGE LEVELS IN A MULTI-TENANT DATABASE ENVIRONMENT," by Brendan O'Connor, filed Jun. 24, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Embodiments of invention relate generally to secure access to data stored in a database. More specifically, embodiments of the invention relate to techniques that allow multiple concurrent accesses to secure data in a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A Session ID in most web applications is represented by a session cookie on the client browser. These session cookies are unique to a given domain, such as First.exampledomain.com and Second.exampledomain.com.

Within a given browser instance, only a single user may be logged in to the web application that behaves this way. If a single physical user has multiple User Identities (IUs) within the application, they cannot be logged in to more than one Identity in the same browser. For example: jsmith1@acme.com and jsmith2@acme.com are two identities belonging to John Smith. If John is logged in as jsmith1 using the Firefox web browser, he must either log out, or launch a new browser (such as Internet Explorer) to be logged in as jsmith2.

In certain situations, it is desirable to be logged in as multiple users concurrently without needing to use different computers or different browsers. However, the rendering of a given HTML page and its associated DOM (Document Object Model) elements, scripts, CSS, and other web components rely on the browser to manage user Identity through its session cookie (or session ID).

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

Figure 1:
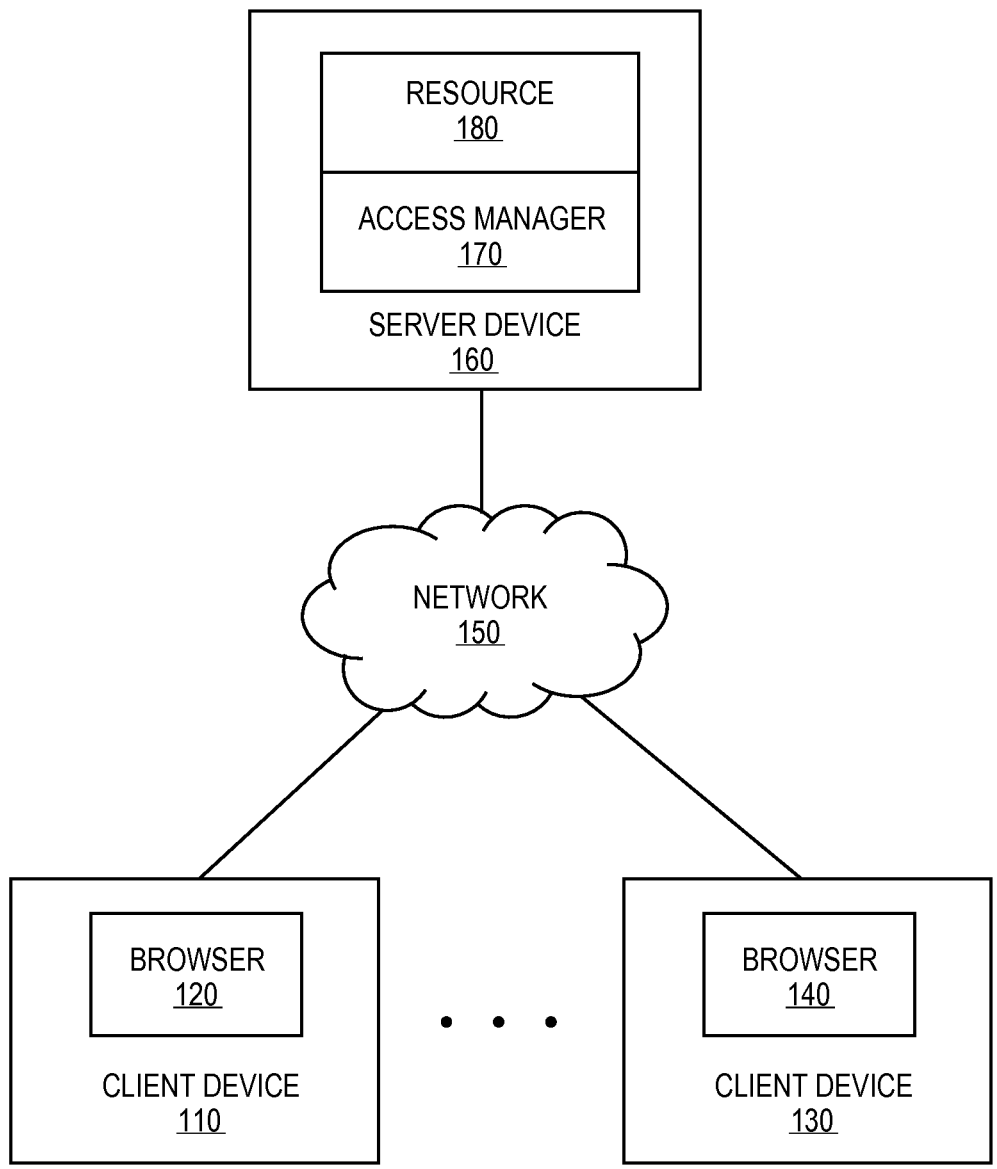
FIG. 1 is a block diagram of one embodiment of an environment in which multiple concurrent user identities may be utilized.

In the following description, numerous specific details are set forth. However, embodiments of the invention may be practiced without these specific details. In other instances, well-known circuits, structures and techniques have not been shown in detail in order not to obscure the understanding of this description.

In one embodiment, in order to allow for multiple concurrent identities, a server component can be written to understand and segregate identities, and dynamically re-write portions of a user interface, for example a HTML page and its related web components. In one embodiment, this server component initiates authentication and a new session for the second identity by looping calls (e.g., HTTP calls) back on itself, and dynamically re-writing responses so that the existing content (e.g., HTML page and components) are not over-written by the session for the second identity.

In one embodiment, there is also client code that bridges the gap between the multiple identities. This component understands the difference between the existing page/components, and the components that were re-written for the second identity. In one embodiment, this client code can utilize the same core elements of the page for both identities, meaning that the application server does not need to alter its behavior, or even be aware that multiple identities exist within the same browser context.

This may be useful, for example, in the use case where an administrator needs to configure and test privilege levels and profiles for other users in the organization. Without the feature(s) described herein, the Administrator must make a change to a user profile, log out, log in as a user with that profile, test the change, and then log out again. Using the feature(s) described herein, the Administrator can be logged in as himself/herself, and be logged in as another identity within the same window and same browser context. The Administrator can make a change to the user profile for the second identity and test that change without any additional effort.

Using this mechanism, the transition between the two identities may be invisible to the user, and the web application looks and behaves as expected for both identities and their respective privilege levels. Thus, the mechanisms described herein may provide a more efficient use of time for users of many types of computing environments including, for example, multitenant database environments.

As another example, a user's privilege level may be increased for a specific operation or operations, or for a specified period of time. Thus, an administrator may be given one or more "super user" privileges. These privileges may be limited in time and/or functionality to avoid abuse. Thus, while many examples are provided herein for a system administrator using a second identity having a reduced privilege level, the same mechanisms may be utilized to increase a user's privilege level.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

In one embodiment, a multi-tenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one of one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

FIG. 1 is a block diagram of one embodiment of an environment in which multiple concurrent user identities may be utilized. The example of FIG. 1 may be used, for example, if a system administrator desires to log in to the system as another user (e.g., to diagnose a user's problem). In other environments, this would require the administrator to log out, log in as the user, diagnose the problem, log out as the user, log in as the administrator, fix the problem, log out as the administrator, log in as the user, verify the problem has been corrected, log out as the user, and log in again as the administrator. This can be a time-consuming and wasteful process for the administrator, especially, if the process is repeated often.

In the example of FIG. 1, client devices (e.g., 110, 130) run browsers (e.g., 120, 140) that allow the client devices to access remote resources over network 150. Network 150 can be any local area network, wide area network, or any combination thereof. The client devices can be any computing platform, whether wired or wireless, that allow users thereof to access network 150 utilizing browsers. Browsers 120 and 140 may be any type of browser that allows a user to access remote resources, for example, Microsoft's Internet Explorer browser, Netscape's Navigator browser, Opera's browser, or a WAP-enabled browser in the case of a cell phone, PDA or other wireless device, or the like.

Server device 160 may be any wired or wireless device that can provide access to resource 180 to client devices 110 and 130 over network 150. For example, server device 160 may be a web server, or server device 160 may be a database server. Access manager 170 operates to control access to resource 180. Resource 180 may be any type of electronic resource on server device 160. For example, resource 180 may be a database in a multitenant environment, resource 180 may be a shared printer, resource 180 may be electronic files stored on server device 160.

Continuing the example started above, a system administrator may use client device 110 and browser 120 to access various network resources including resource 180 on server device 160. Another user, not having system administrator level privileges, may access various network resources including resource 180 on server device 160. Because the user of client device 110 and the user of client device 130 may have different privilege levels, they may have access to different feature sets and different data sets. The concept of differing privilege levels is known in the art.

The Same Origin Policy (SOP), which is enforced by most browsers prevent straight forward access utilizing multiple identities. The Same Origin Policy is a security concept for a number of browser-side programming languages that permits scripts running on pages originating from the same site to access each other's methods and properties with no specific restrictions, but prevents access to most methods and properties across pages on different sites. This mechanism is utilized, for example, with cookies to maintain authenticated user sessions, as servers act based on the cookie information to reveal information or take state-changing actions. Thus, when using a browser that supports SOP, the system administrator cannot use browser 120 to access resource 180 as the user of browser 140.

Another browser security feature is Fully Qualified Domain Name (FQDN), also referred to as an Absolute Domain Name, which specifies a domain within a tree hierarchy of the Domain Name System (DNS). The FQDN specifies all domain levels, including the top-level domain and the root domain. A fully qualified domain name can only be interpreted one way.

In one embodiment, a first user (e.g., the system administrator) may access resource 180 by using browser 120 and a first cookie (e.g., NA1.resource.com) and a second user may access resource 180 using browser 140 and a second cookie (e.g., NA2.resource.com). The first and second cookies may have the same or different privilege levels. In the example of the first user being a system administrator, the second user and second cookie will have a lower privilege level.

In one embodiment, client device 110, through browser 120 or another component, may create a user profile and or cookie that is a child entity of the first profile. In one embodiment, the child cookie has a different domain (e.g., NA1.interface.com) than the first cookie. By generating a cookie having a different domain than the first cookie, the user of browser 120 may be able to access resource 180 using multiple user identities that may have different privilege levels.

Thus, when the user of browser 120 attempts to access resource 180, the access appears to access manager 170 and resource 180 as coming from a different user. In one embodiment, access manager 170 receives the access request associated with the child cookie (e.g., NA1.interface.com) and reconfigures the request before forwarding the request to resource 180. In one embodiment, the request with the child cookie includes information regarding the user identity and/or privilege level of the user for which access to resource 180 is sought.

In one embodiment, access manager 170 includes a mapping or other mechanism to track the child cookie identity and/or privilege level and the identity and/or privilege level of the user of browser 140. Access manager 170 generates a request to resource 180 corresponding to the request from browser 120, but with the user identities and/or other information corresponding to the user of browser 140. Thus, resource 180 receives an access request that appears to be from browser 140 and the user thereof.

In response to the access request, resource 180 responds as if the request came from browser 140. Access manager 170 receives the response from resource 180 and reconfigures the response. In one embodiment, access manager 170 generates a response to browser 120 utilizing the response data from resource 180 and the child user identity information. Thus, browser 120 will receive a response from server device 160 that may appear as if resource 180 was accessed by browser 120 with the user identity (e.g., NA2.resource.com) of the user of client device 130.

In one embodiment, browser 120 may provide a graphical user interface that provides a portion of the interface corresponding to the parent user identity and a portion of the interface corresponding to the child/second identity. With this interface, a user of browser 120 may have access to features and/or configurations corresponding to multiple privilege levels.

Figure 2:
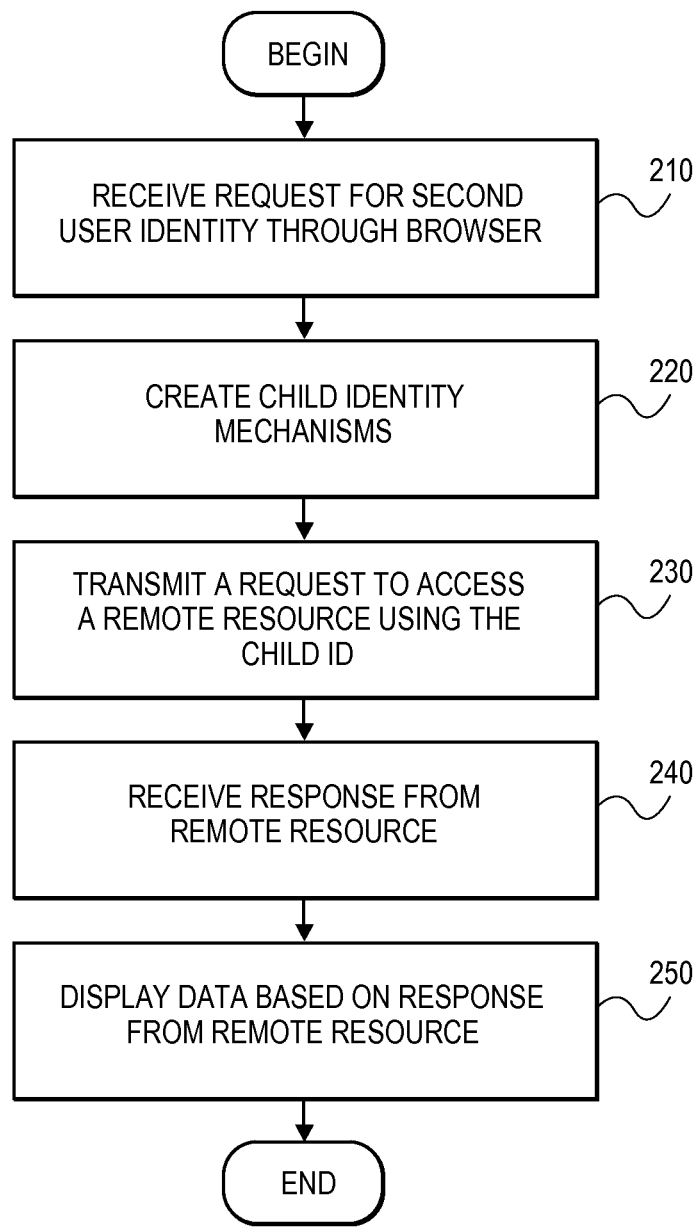
FIG. 2 is a flow diagram of one embodiment of a process by a browser or client application to access a remote resource using multiple identities.

FIG. 2 is a flow diagram of one embodiment of a process by a browser or client application to access a remote resource using multiple identities. The operation according to FIG. 2 may be performed by, for example, client device 110 and/or browser 120 as illustrated in FIG. 1.

A request is received for a second identity, 210. In one environment, the ability to request a second identity is tied to a user privilege level so that only users having a sufficiently high privilege level (e.g., system administrator) may be allowed to request a second identity.

In response to receiving the request for the second identity, a child identity is generated, 220. In one embodiment, the child identity has a corresponding browser cookie that has a different domain than the browser cookie corresponding to the parent identity. The child identity is utilized for accessing one or more remote resources as a different user.

A request is transmitted to a remote resource using the child identity, 230. As described above, the child identity is utilized by an access manager to regenerate access requests to appear as if from the browser of another user. That is, the browser and/or client device from which the requests utilizing the child identity are transmitted communicates with the remote resource using only the child identity. That browser is not required to manage the mapping of the child identity to the identity to be emulated.

In one embodiment, the child identity and associated cookies (and other identifiers, if necessary) may be generated by the remote resource when the user is accessing the resource using the parent identity. In another embodiment, the child identity and associated cookies may be generated by a local component, for example, a browser plug-in.

At some later time, the browser may receive a response from the remote resource, 240. This response utilizes the child identity so that the browser may satisfy the Same Origin Policy and Fully Qualified Domain Name policies as described above. When the browser receives the response from the remote resource, the browser may display data based on the response, 250. In one embodiment, the browser may display information corresponding to both identities simultaneously.

Figure 3:
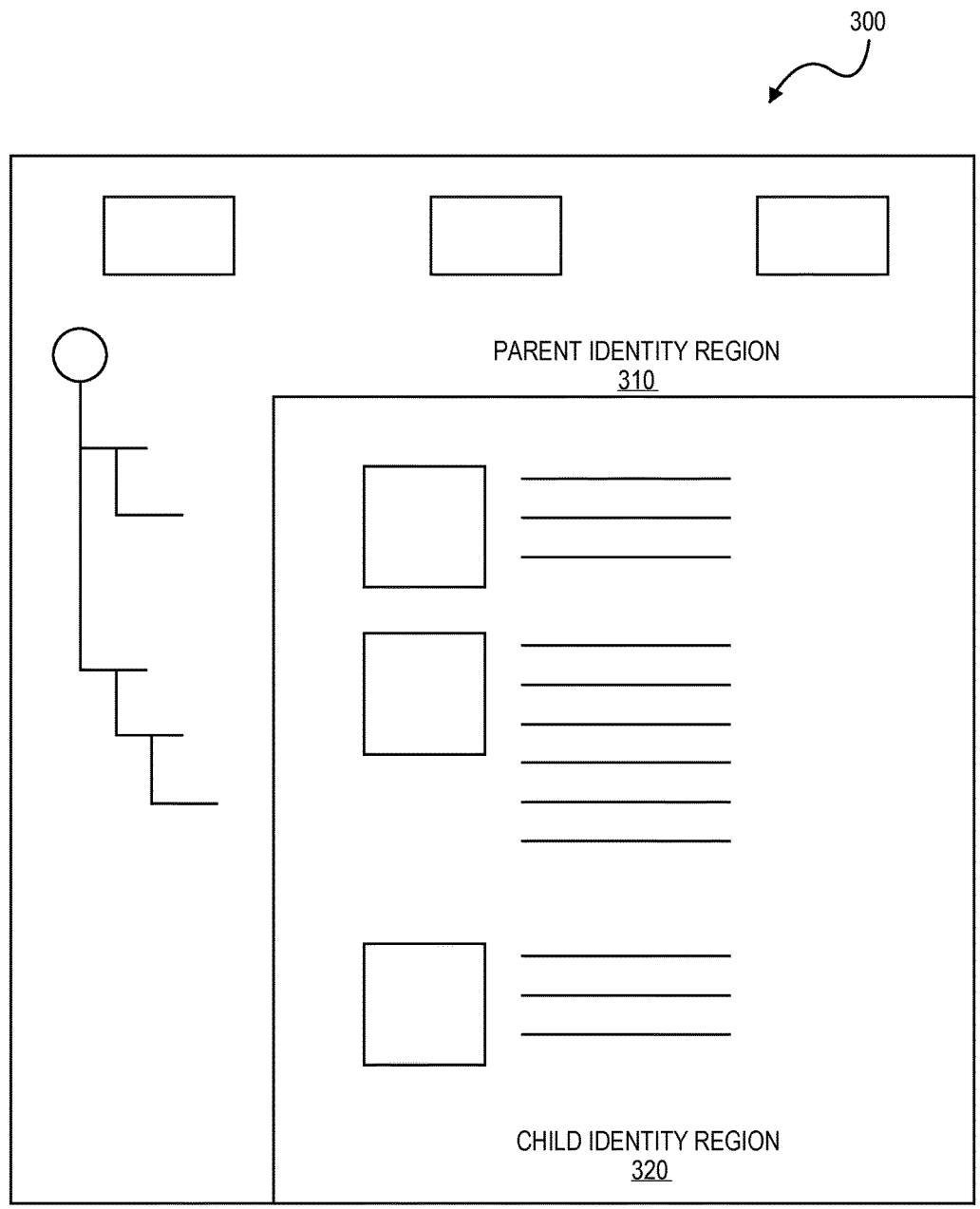
FIG. 3 is a conceptual display of a graphical user interface providing information corresponding to multiple user identities.

FIG. 3 is a conceptual display of a graphical user interface providing information corresponding to multiple user identities. The example of FIG. 3 is merely one example of the type of layout and information utilization that may be provided by a browser through which a resource is accessed using multiple user identities.

In one embodiment, user interface 300 may include at least two regions: parent identity region 310 and child identity region 320. In one embodiment, child identity region provides information corresponding to functionality and operations for the child identity. That is, child identity region 320 may provide a view as if the user of the browser were operating as the second identity corresponding to the child identity.

For example, a system administrator may be able to access a remote resource (e.g., a multitenant database environment) as another user and have in child identity region 320 the view as if the system administrator were that user. This may allow the system administrator to have the experience of the other user and thereby diagnose problems experienced by the other user without having to log out and log in repeatedly, as described above.

Parent identity region 310 may provide the user with functionality not available to the child identity. Using the system administrator example above, parent identity region 310 may provide system administrator tools available only to a system administrator. This may allow the system administrator to operate as a system administrator while also diagnosing problems as another user in child identity region 320. Other uses of parent identity region 310 and child identity region 320 may also be supported.

Figure 4:
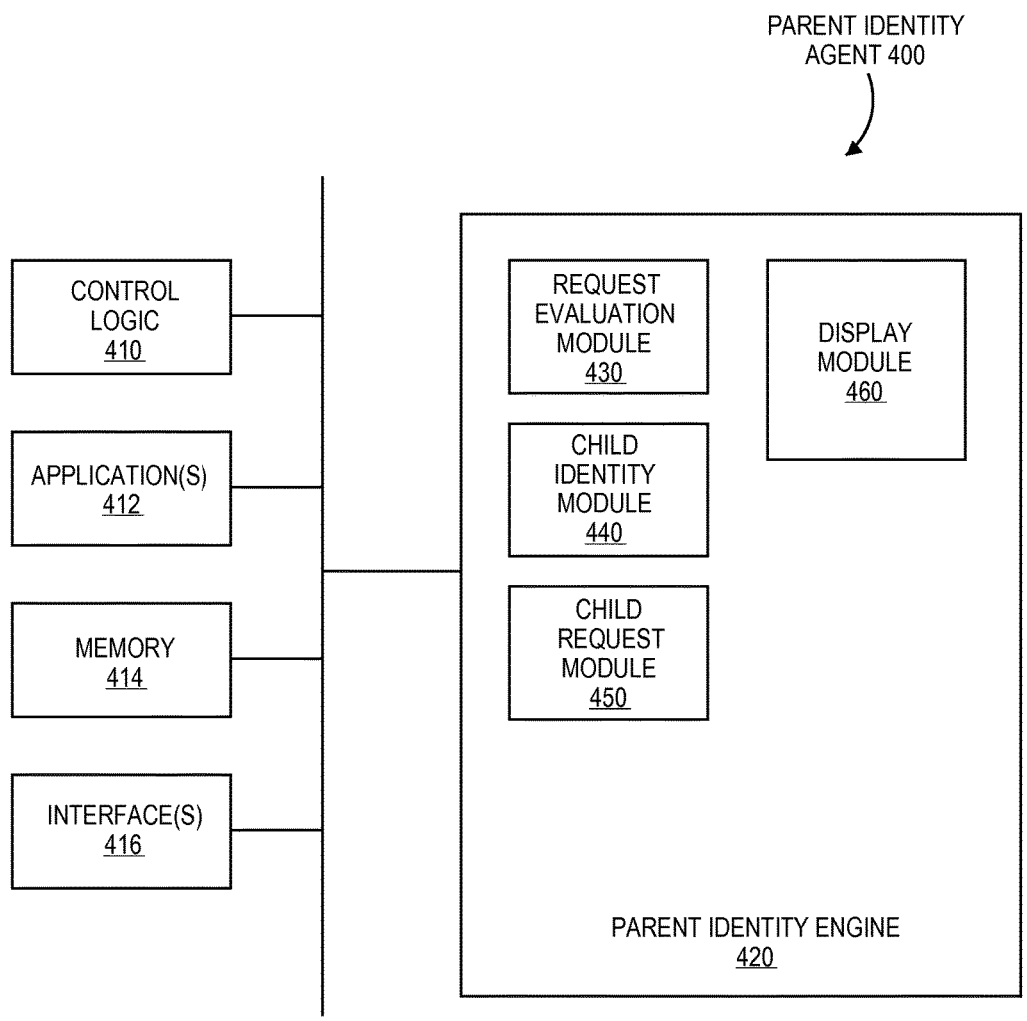
FIG. 4 is a block diagram of one embodiment of a primary identity agent.

FIG. 4 is a block diagram of one embodiment of a primary identity agent. The components and/or functionality provided by the primary identity agent may be implemented in a remote resource accessed by a browser (e.g., a multitenant database environment) and/or a local client device having a browser. In one embodiment, the browser used by the client device is a standard browser that conforms to the Same Origin Policy and the Fully Qualified Domain Name policies described above. Thus, the functionality described with respect to FIG. 4 may be provided by components that are external to the browser or may be provided by an addition to the browser, for example, a plug in module.

Primary identity agent 400 includes control logic 410, which implements logical functional control to direct operation of primary identity agent 400, as software and/or hardware associated with directing operation of primary identity agent 400. Logic may be hardware logic circuits and/or software routines. In one embodiment, parent identity agent 400 includes one or more applications 412, which represent code sequence and/or programs that provide instructions to control logic 410.

Primary identity agent 400 includes memory 414, which represents a memory device and/or access to a memory resource for storing data and/or instructions. Memory 414 may include memory local to parent identity agent 400, as well as, or alternatively, including memory of the host system on which primary identity agent 400 resides. Primary identity agent 400 also includes one or more interfaces 416, which represent access interfaces to/from (an input/output interface) primary identity agent 400 with regard to entities (electronic or human) external to primary identity agent 400.

Parent identity agent 400 also includes parent identity engine 420, which represents one or more functions or modules that enable parent identity agent 400 to provide the services as described above. The example of FIG. 4 provides several modules that may be included in parent identity engine 420; however, different and/or additional modules may also be included. Example modules that may be involved in providing the identity and access functionality include request evaluation module 430, child identity module 440, child request module 450 and display module 460. Each of these modules may further include other sub-modules to provide other functions. As used herein, a module refers to routine, a subsystem, logic circuit, microcode, etc., whether implemented in hardware, software, firmware or some combination thereof.

Request evaluation module 430 provides security and/or authentication functionality to protect against unauthorized users generating child identities and accessing resources as other users. In one embodiment, request evaluation module 430 restricts generation of child identities to specified privilege levels (e.g., system administrator, super user, etc.). In one embodiment, request evaluation module 430 further limits the uses of the child identity to a specified list of authorized functions so that the child identity is only used for legitimate purposes. In alternate embodiments, request evaluation module 430 may provide additional functionality.

Child identity module 440 functions to provide the identity mechanisms (e.g., cookies, mapping information) associated with the child identity. In one embodiment, child identity module 440 provides mapping information to the access manager (e.g., 170 in FIG. 1) regarding what user identities correspond to the child identity and/or what functionality is authorized for the child identity. Child identity module 440 may also provide additional functionality.

Child request module 450 provides functionality to generate a request to a remote resource using the child identity. In one embodiment, child request module 450 causes a browser accessing the remote resource to generate one or more requests with the child identity rather than the parent identity without requiring the user to log out or otherwise explicitly change identities.

Display module 460 causes the browser to display information received from the remote resource using the parent identity and/or the child identity. In one embodiment, display module 460 causes the browser to generate a display as discussed above with respect to FIG. 3. Other display configurations can also be supported by display module 460.

Figure 5:
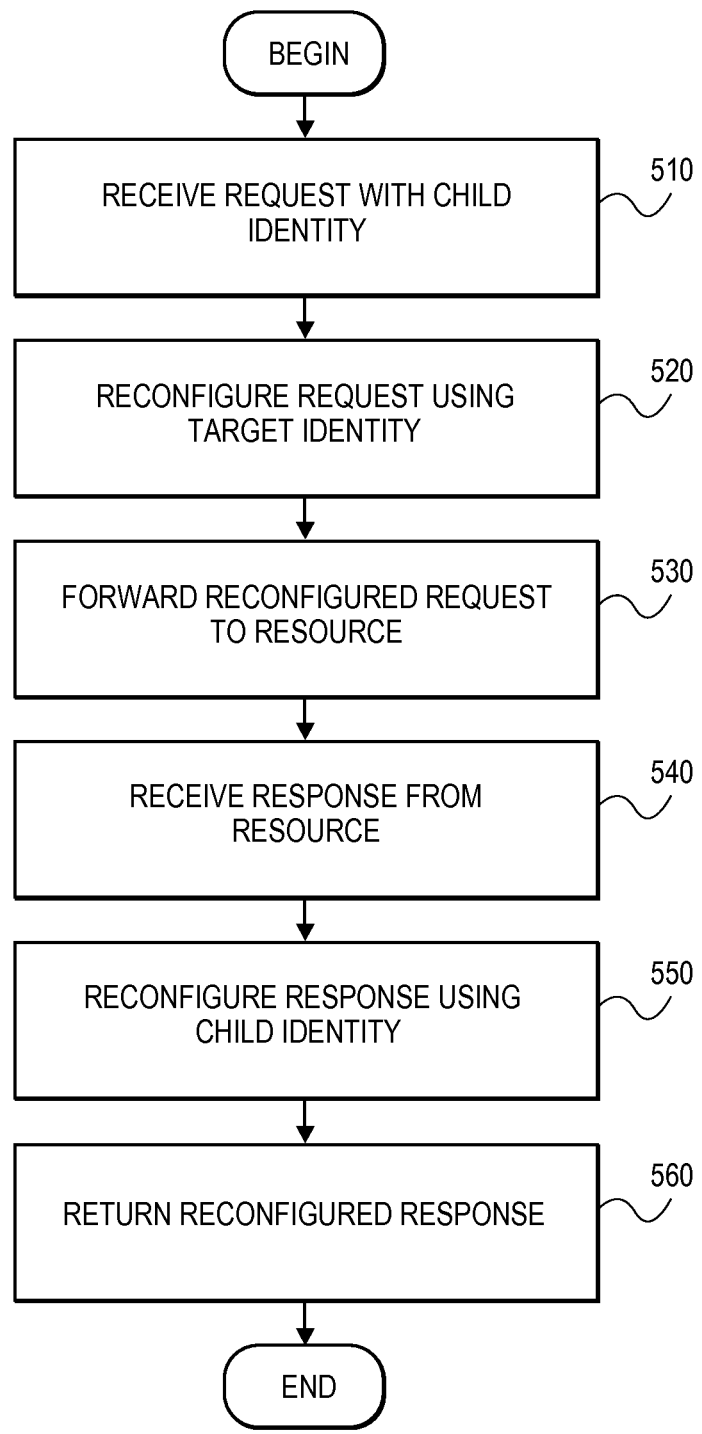
FIG. 5 is a flow diagram of one embodiment of a technique for receiving and processing an access request utilizing a child identity.

FIG. 5 is a flow diagram of one embodiment of a technique for receiving and processing an access request utilizing a child identity. The operation according to FIG. 5 may be performed by, for example, server device 160, access manager 170 and/or resource 180 as illustrated in FIG. 1.

A request using the child identity is received, 510. In one embodiment, the request is received from a browser on a client device. The request may include (or be associated with) a cookie or other identifier indicating the child identity, where the child identity is a child of a parent identity being used by the browser making the request. In one embodiment, the child identity has a different domain than the parent identity. Other and/or different distinguishing characteristics may also be utilized.

The access manager (or other component) may reconfigure the request with the target identity, 520. In one embodiment, the access manager maintains a table or other mapping between child identities and target identities. The access manager may use this mapping information to "replace" the child identity with the target identity so that the requesting browser operates using the child identity and the resource being accessed operates using the target identity. Using the system administrator example from above, the target identity is the identity of the user accessing resource 180 using browser 140. Thus, the access appears to the resource as if it came from a different browser and/or a different user.

The access manager (or other component) forwards the reconfigured request to the resource to be accessed, 530. The resource processes the reconfigured request as if it were a request corresponding to the target identity from the browser corresponding to the target identity. The access manager (or other component) receives the response from the resource, 540.

The access manager (or other component) reconfigures the response from the target identity to the child identity, 550. The access manager may use the mapping information to "replace" the target identity with the child identity to perform the opposite reconfiguration as described above. The response with the child identity is returned to the requesting browser, 560. Thus, the response appears to the browser as if it came from the resource using the child identity.

Figure 6:
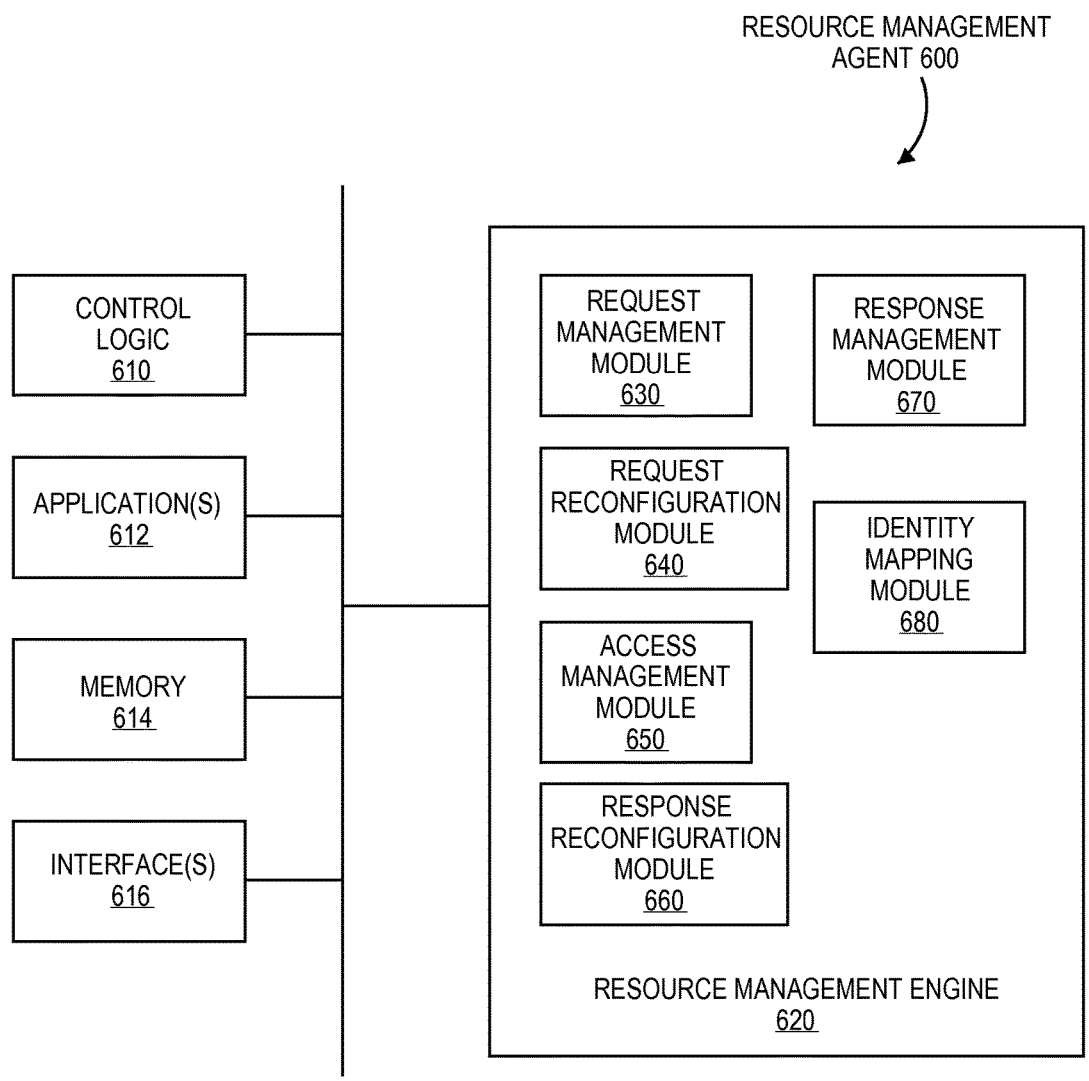
FIG. 6 is a block diagram of one embodiment of a resource management agent.

FIG. 6 is a block diagram of one embodiment of a resource management agent. The components and/or functionality provided by the resource management agent may be implemented in a remote resource accessed by a browser (e.g., a multitenant database environment) and/or a local client device having a browser. In one embodiment, the browser used by the client device is a standard browser that conforms to the Same Origin Policy and the Fully Qualified Domain Name policies described above. Thus, the functionality described with respect to FIG. 6 may be provided by components that are external to the browser or may be provided by an addition to the browser, for example, a plug in module.

Resource management agent 600 includes control logic 610, which implements logical functional control to direct operation of resource management agent 600, as software and/or hardware associated with directing operation of resource management agent 600. Logic may be hardware logic circuits and/or software routines. In one embodiment, resource management agent 600 includes one or more applications 612, which represent code sequence and/or programs that provide instructions to control logic 610.

Resource management agent 600 includes memory 614, which represents a memory device and/or access to a memory resource for storing data and/or instructions. Memory 614 may include memory local to resource management agent 600, as well as, or alternatively, including memory of the host system on which resource management agent 600 resides. Resource management agent 600 also includes one or more interfaces 616, which represent access interfaces to/from (an input/output interface) resource management agent 600 with regard to entities (electronic or human) external to resource management agent 600.

Resource management agent 600 also includes resource management engine 620, which represents one or more functions or modules that enable resource management agent 600 to provide the services as described above. The example of FIG. 6 provides several modules that may be included in resource management engine 620; however, different and/or additional modules may also be included. Example modules that may be involved in providing the identity and access functionality include request management module 630, request reconfiguration module 640, access management module 650, response reconfiguration module 660, response management module 670 and identity mapping module 680. Each of these modules may further include other sub-modules to provide other functions. As used herein, a module refers to routine, a subsystem, logic circuit, microcode, etc., whether implemented in hardware, software, firmware or some combination thereof.

Identity mapping module 680 maintains a mapping between one or more child identities and one or more corresponding target identities. In one embodiment, identity mapping module 680 also maintains privilege level and/or functionality limitations associated with the identities. Identity mapping module 680 may derive information from incoming requests and/or may receive explicit mapping information related to identities to be used to access a resource.

Request management module 630 receives requests from remote client devices and determines whether the identity associated with individual requests is the correct identity to use, or if the identity associated with the request is a child identity that should be processed as described above, with respect to FIG. 5. In one embodiment, request management module 630 interacts with identity mapping module 680 to determine if (or whether) the request should be reconfigured.

Request reconfiguration module 640 operates to modify the request received by request management module 640 to appear as if it were from a browser accessing the resource using the target identity. In one embodiment, request reconfiguration module 640 generates a new request that includes the target identity. Request reconfiguration module 640 may operate with information from identity mapping module 680 to reconfigure the request.

Access management module 650 operates to control access to the resource using the requests and associated identities. Access management module 650 may operate to enforce privilege levels and/or functionality restrictions based on, for example, user identities and functionality conditions. For example, access management module 650 may allow access to a resource for the target identity, but not for the child identity, or access management module 650 may allow different levels of access for the child identity and the target identity.

Response reconfiguration module 660 operates to modify the response received from the resource to appear as if it were for the browser accessing the resource using the target identity. In one embodiment, response reconfiguration module 660 generates a new response that includes the child identity. Response reconfiguration module 660 may operate with information from identity mapping module 680 to reconfigure the response.

Response management module 670 operates to communicate the reconfigured response from response configuration module 660 to the requesting browser. In one embodiment, response management module provides the response as a HTTP response, or any other type of network protocol that may be supported.

Figure 7:
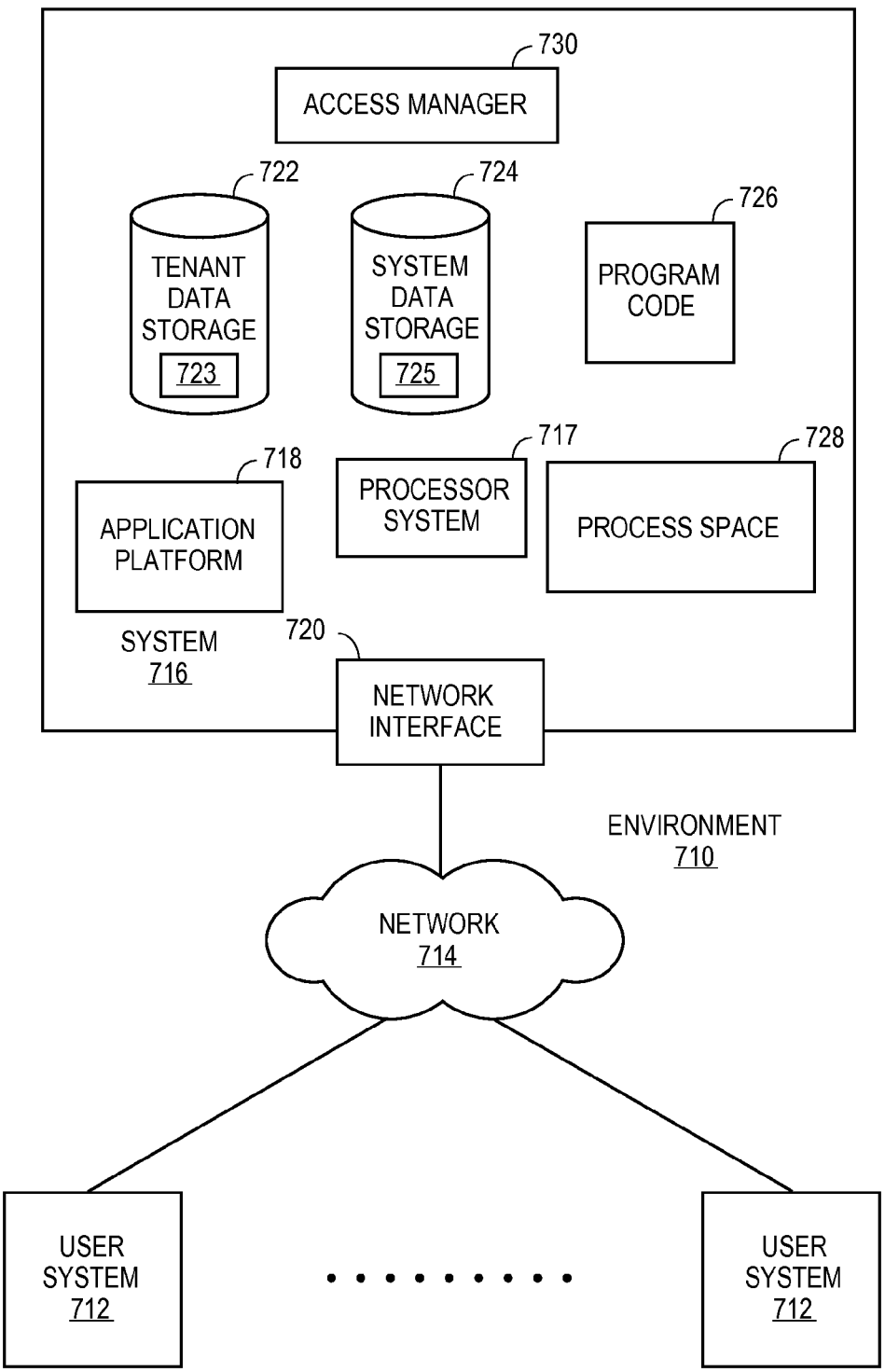
FIG. 7 is a block diagram of one embodiment of a multitenant environment.

FIG. 7 illustrates a block diagram of an environment 710 wherein an on-demand database service might be used. Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7 (and in more detail in FIG. 8) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein. A database image may include one or more database objects.

A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content.

With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 16 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714.

Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known.

It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 8:
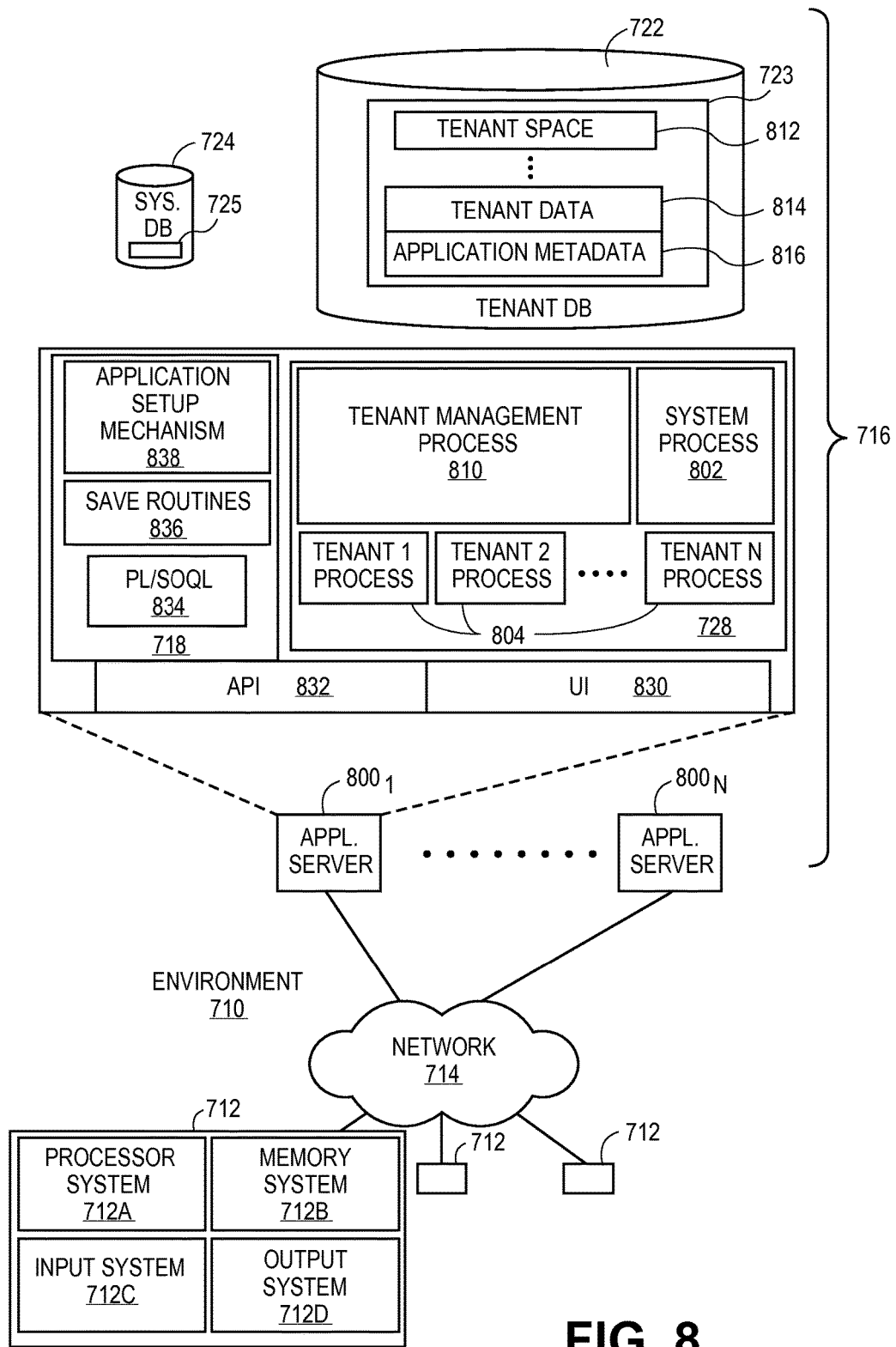
FIG. 8 is a block diagram of one embodiment of a multitenant database environment.

FIG. 8 also illustrates environment 710. However, in FIG. 8 elements of system 716 and various interconnections in an embodiment are further illustrated. FIG. 8 shows that user system 712 may include processor system 712A, memory system 712B, input system 712C, and output system 712D. FIG. 8 shows network 714 and system 716. FIG. 8 also shows that system 716 may include tenant data storage 722, tenant data 723, system data storage 724, system data 725, User Interface (UI) 830, Application Program Interface (API) 832, PL/SOQL 834, save routines 836, application setup mechanism 838, applications servers 800₁-800_N, system process space 802, tenant process spaces 804, tenant management process space 810, tenant storage area 812, user storage 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 7. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks.

As shown by FIG. 8, system 716 may include a network interface 720 (of FIG. 7) implemented as a set of HTTP application servers 800, an application platform 718, tenant data storage 722, and system data storage 724. Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712.

The tenant data 723 might be divided into individual tenant storage areas 812, which can be either a physical arrangement and/or a logical arrangement of data. Within each tenant storage area 812, user storage 814 and application metadata 816 might be similarly allocated for each user. For example, a copy of a user's most recently used (MRU) items might be stored to user storage 814. Similarly, a copy of MRU items for an entire organization that is a tenant might be stored to tenant storage area 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832.

A detailed description of some PL/SOQL language embodiments is discussed in commonly owned U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server 800₁ might be coupled via the network 714 (e.g., the Internet), another application server 800_{N-1} might be coupled via a direct network link, and another application server 800_N might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800.

In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 800 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein.

Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", now U.S. Pat. No. 7,779,039 and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for providing concurrent access to a single resource via multiple user identities via a single browser instance wherein the browser supports fully qualified domain names that can only be interpreted one way, the method comprising:
   allowing a first access in a first session, for a client entity, to the resource, wherein the client entity utilizes a first user identity having a first cookie in the single browser instance;
   detecting an attempt to access, for the client entity, the resource concurrently with the first access utilizing a second user identity in the single browser instance, wherein the second user identity having a second cookie that has a different corresponding domain than the first cookie;
   initiating authentication and a new session for the second user identity in the single browser instance by looping calls for the new session back to the browser instance and dynamically re-writing responses with the browser instance so that existing content presented by the single browser instance in the first session is not over-written by the new session for the second identity;
   restructuring the attempt to access the resource with the second user identity as an attempt to access the resource with a third user identity having a third cookie that is not a child identity of the first user identity, wherein the attempt to access the resource with the third user identity is from the single browser instance;
   forwarding a request to access the resource by the third user identity to the resource concurrently with the first access with the first user identity;
   receiving a response to the request to access the resource by the third user identity from the resource;
   restructuring the response from the resource as a response to the client entity accessing the resource utilizing the second user identity in the single browser instance; and
   sending the response to the client entity accessing the resource utilizing the second user identity in the single browser instance.

2. The method of claim 1 wherein the resource comprises a multitenant database environment, wherein the multitenant database environment stores data for multiple client entities each identified by a tenant identifier (ID) having one of one or more users associated with the tenant ID, wherein users of each of multiple client entities can only access data identified by a tenant ID associated with the respective client entity, and wherein the multitenant database is a hosted database provided by an entity separate from the client entities, and provides on-demand database service to the client entities.

3. The method of claim 1 wherein the resource comprises a server providing one or more documents conforming to a HyperText Markup Language (HTML) format.

4. The method of claim 1 wherein the client entity comprises a single instance of a browser application.

5. The method of claim 1 wherein the first user identity has a first privilege level and the third user identity has a second privilege level.

6. The method of claim 1 further comprising causing the client entity to display content from the resource via a graphical user interface, wherein at least a first portion of the graphical user interface provides requested data from the resource in the same manner as would be displayed to a user corresponding to the third user identity.

7. The method of claim 6 further comprising causing the client entity to display content from the resource via the graphical user interface, wherein at least a second portion of the graphical user interface provides data from the resource for a user corresponding to the first user identity.

8. An article of manufacture comprising a non-transitory computer-readable medium having stored thereon instructions that, when executed by one or more processors, cause the one or more processors to:
allow a first access in a first session, for a client entity, to the resource, wherein the client entity utilizes a first user identity having a first cookie in the single browser instance wherein the browser supports fully qualified domain names that can only be interpreted one way;
detect an attempt to access, for the client entity, the resource concurrently with the first access utilizing a second user identity in the single browser instance, wherein the second user identity having a second cookie that has a different corresponding domain than the first cookie;
initiate authentication and a new session for the second user identity in the single browser instance by looping calls for the new session back to the browser instance and dynamically re-writing responses with the browser instance so that existing content presented by the single browser instance in the first session is not over-written by the new session for the second identity;
restructure the attempt to access the resource with the second user identity as an attempt to access the resource with a third user identity having a third cookie that is not a child identity of the first user identity, wherein the attempt to access the resource with the third user identity is from the single browser instance;
forward a request to access the resource by the third user identity to the resource concurrently with the first access with the first user identity;
receive a response to the request to access the resource by the third user identity from the resource;
restructure the response from the resource as a response to the client entity accessing the resource utilizing the second user identity in the single browser instance; and
send the response to the client entity accessing the resource utilizing the second user identity in the single browser instance.

9. The article of claim 8 wherein the resource comprises a multitenant database environment, wherein the multitenant database environment stores data for multiple client entities each identified by a tenant identifier (ID) having one of one or more users associated with the tenant ID, wherein users of each of multiple client entities can only access data identified by a tenant ID associated with the respective client entity, and wherein the multitenant database is a hosted database provided by an entity separate from the client entities, and provides on-demand database service to the client entities.

10. The article of claim 8 wherein the resource comprises a server providing one or more documents conforming to a HyperText Markup Language (HTML) format.

11. The article of claim 8 wherein the client entity comprises a single instance of a browser application.

12. The article of claim 8 wherein the first user identity has a first privilege level and the third user identity has a second privilege level.

13. The article of claim 8 further comprising instructions that, when executed by the one or more processors, cause the one or more processors to cause the client entity to display content from the resource via a graphical user interface, wherein at least a first portion of the graphical user interface provides requested data from the resource in the same manner as would be displayed to a user corresponding to the third user identity.

14. The article of claim 13 further comprising instructions that, when executed by the one or more processors, cause the one or more processors to cause the client entity to display content from the resource via the graphical user interface, wherein at least a second portion of the graphical user interface provides data from the resource for a user corresponding to the first user identity.

15. A system comprising:
one or more user systems;
a server system communicatively coupled with the one or more user systems via a network, the server system to provide a multitenant environment, wherein the multitenant environment includes data for multiple client entities, each identified by a tenant identifier (ID) having one of one or more users associated with the tenant ID, users of each of multiple client identities can only access data identified by a tenant ID associated with the respective client entity, and the multitenant environment is at least a hosted database provided by an entity separate from the client entities, and provides on-demand database service to the client entities, the server system further to
allow a first access in a first session, for a client entity, to the resource, wherein the client entity utilizes a first user identity having a first cookie in the single browser instance wherein the browser supports fully qualified domain names that can only be interpreted one way;
detect an attempt to access, for the client entity, the resource concurrently with the first access utilizing a second user identity in the single browser instance, wherein the second user identity having a second cookie that has a different corresponding domain than the first cookie;
initiate authentication and a new session for the second user identity in the single browser instance by looping calls for the new session back to the browser instance and dynamically re-writing responses with the browser instance so that existing content presented by the single browser instance in the first session is not over-written by the new session for the second identity;
restructure the attempt to access the resource with the second user identity as an attempt to access the resource with a third user identity having a third cookie that is not a child identity of the first user identity, wherein the attempt to access the resource with the third user identity is from the single browser instance;

forward a request to access the resource by the third user identity to the resource concurrently with the first access with the first user identity;

receive a response to the request to access the resource by the third user identity from the resource;

restructure the response from the resource as a response to the client entity accessing the resource utilizing the second user identity in the single browser instance; and send the response to the client entity accessing the resource utilizing the second user identity in the single browser instance.

16. The system of claim 15 wherein the resource comprises a server providing one or more documents conforming to a HyperText Markup Language (HTML) format.

17. The system of claim 15 wherein the client entity comprises a single instance of a browser application.

18. The system of claim 15 wherein the first user identity has a first privilege level and the third user identity has a second privilege level.

19. The system of claim 15, the server system further to cause the client entity to display content from the resource via a graphical user interface, wherein at least a first portion of the graphical user interface provides requested data from the resource in the same manner as would be displayed to a user corresponding to the third user identity.

20. The system of claim 19, the server system further to cause the client entity to display content from the resource via the graphical user interface, wherein at least a second portion of the graphical user interface provides data from the resource for a user corresponding to the first user identity.

* * * * *